Nov. 24, 1959 E. R. KNOWLES 2,913,762
PLASTIC MOLDING MACHINE
Filed Dec. 21, 1953 3 Sheets-Sheet 1

INVENTOR
Edward R. Knowles
BY
Curtis, Morris + Safford
ATTORNEYS

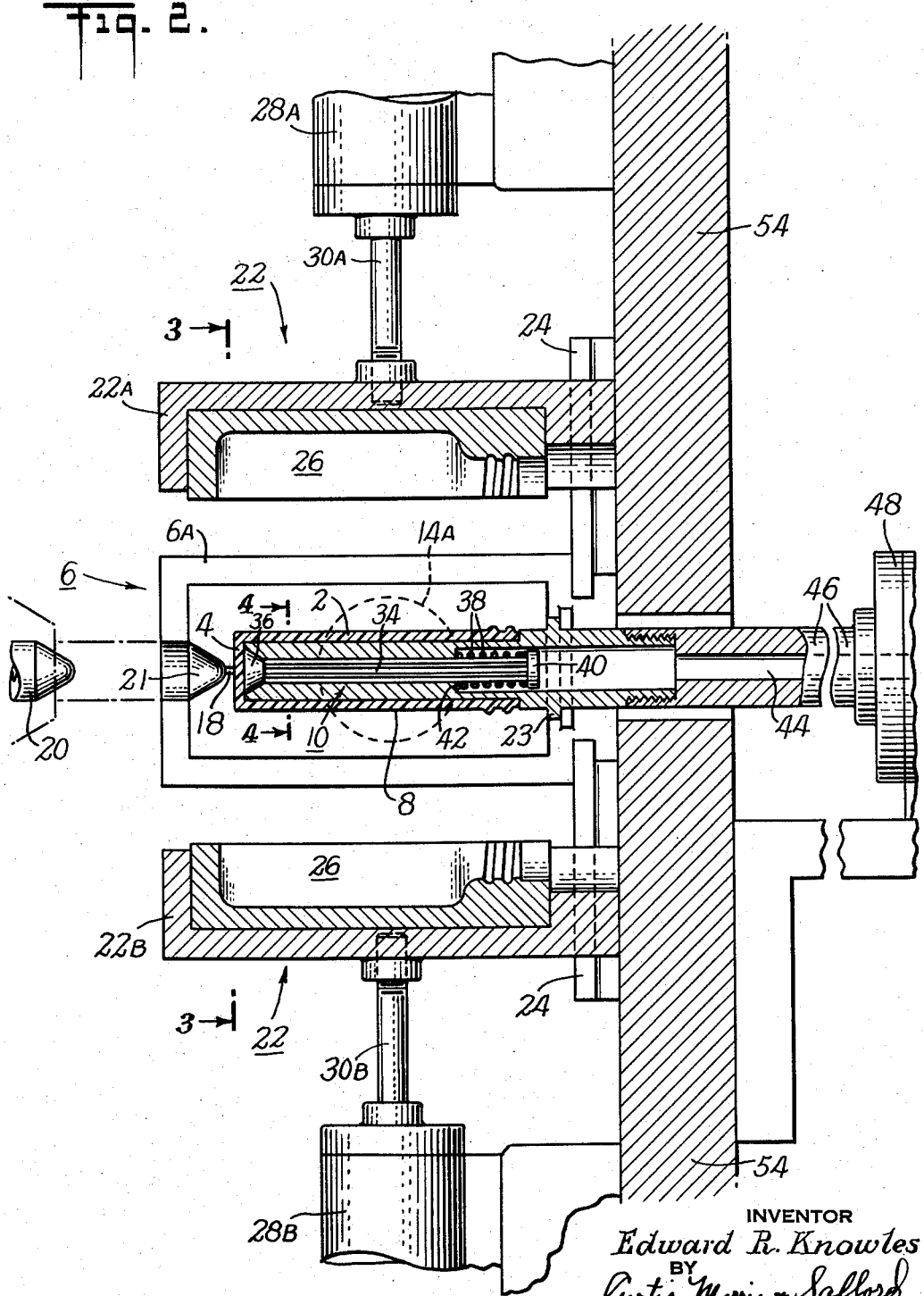

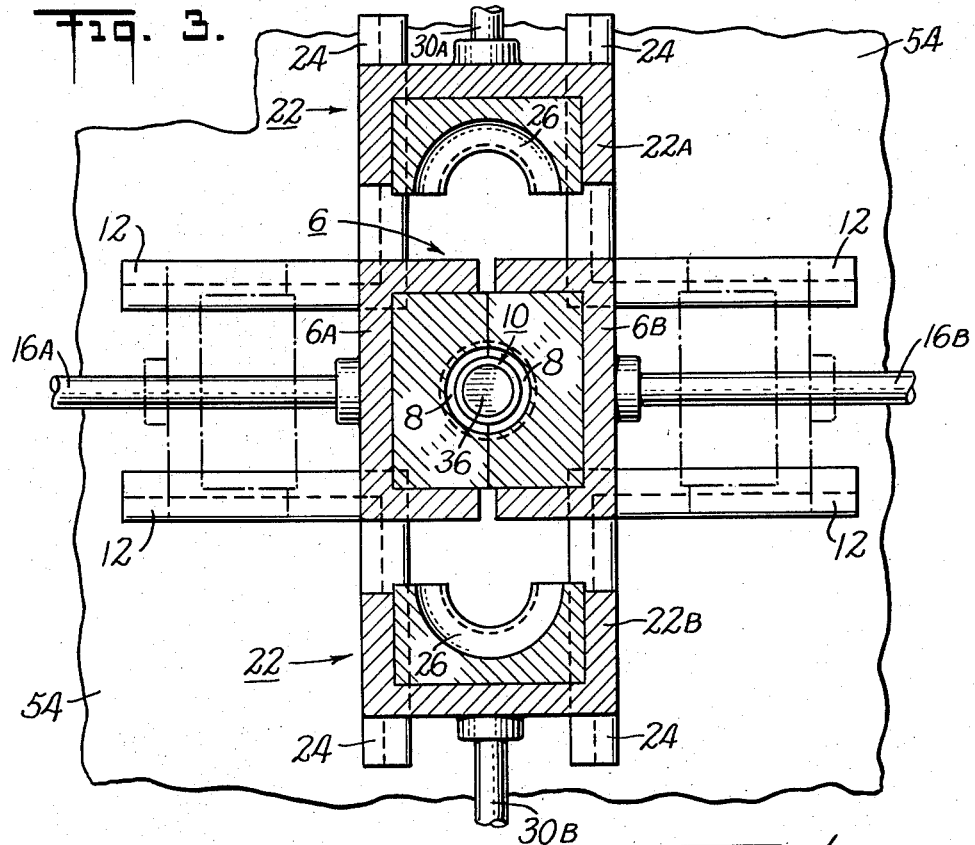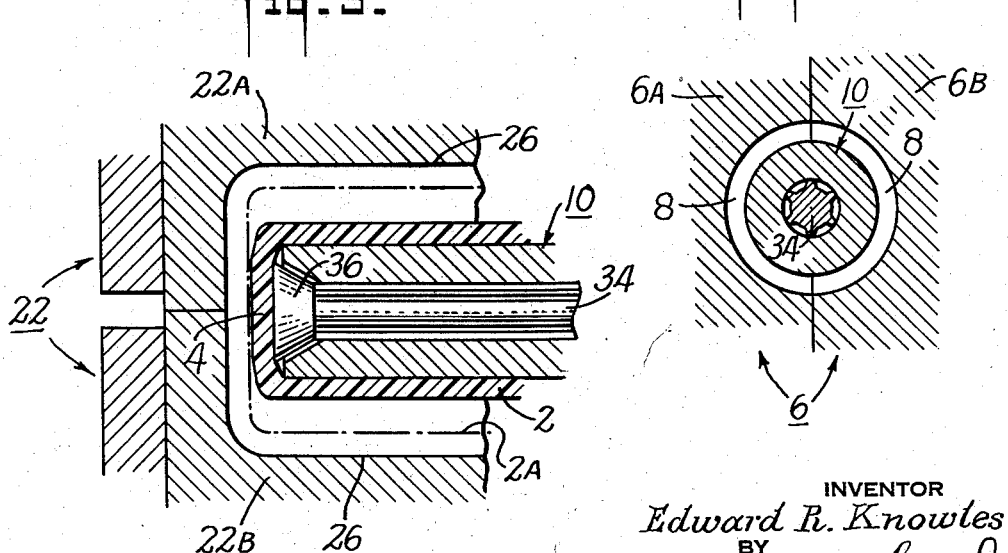

United States Patent Office 2,913,762
Patented Nov. 24, 1959

2,913,762

PLASTIC MOLDING MACHINE

Edward R. Knowles, Fairfield, Conn., assignor, by mesne assignments, to The Specialty Papers Company, Dayton, Ohio, a corporation of Ohio Application December 21, 1953, Serial No. 399,502

7 Claims. (Cl. 18—5)

This invention relates to methods of and apparatus for blowing hollow plastic articles, for example in the manufacture of flexible bottles formed of polyethylene.

Various methods have been proposed for the fabrication of hollow plastic articles. One of the most common methods includes placing a short tube of heat-softened plastic materal within a mold and then inflating the plastic material so that it conforms with the shape of the mold cavity. The molding may take place while the plastic tubing is attached to the extruder, in which case the air is admitted through the mechanism by which the plastic tubing is extruded. In some instances, the mold is clamped onto a tube of softened plastic material and a hollow needle introduced into the mold perforates the plastic wall. Air is then admitted into the plastic through the hollow needle to inflate the plastic.

In certain of these systems, a considerable amount of finishing is required subsequent to the molding operation and in other systems a single extruding head can be used with only one mold. The systems now in use are subject to various other disadvantages, such as the difficulty of molding hollow objects having neck portions of substantially reduced diameter.

In a preferred embodiment of the present invention, a parison of plastic material is formed by injection molding around a core positioned within a mold cavity. The two separable parts of the mold are then moved away from the core which continues to support the parison, and two parts of a second mold which have interior cavities in the shape of the article to be molded are positioned around the central core. After the article-forming mold is positioned around the parison, which is accomplished while the parison is still hot from the injection molding and before it has cooled to a substantial extent, air at superatmospheric pressure is admitted into the parison which is expanded by the air-pressure to conform to the interior of the mold cavity. As soon as this molding operation is complete, the core around which the parison was originally formed is withdrawn from the mold and the two halves of the article-forming mold are opened permitting the hollow plastic article to be removed either mechanically or by the force of gravity. The neck portion of the molded article is properly shaped and finished in the molds so that no subsequent reaming, cutting, or polishing operations are required. The molding system described herein is readily incorporated into an automatic arrangement for the making of plastic articles and requires a minimum of supervision. These and other objects, aspects and advantages of the invention will be in part pointed out and in part apparent from the following description of a preferred embodiment of the invention considered together with the accompanying drawings, in which:

Figure 2 is a sectional view taken approximately on line 2—2 of Figure 1;

Figure 3 is a partial section taken on line 3—3 of Figure 2, showing the parison-forming mold in closed position;

Figure 4 is an enlarged partial sectional view taken along line 4—4 of Figure 2; and Figure 5 is an enlarged partial sectional view corresponding to a portion of Figure 2 but showing the article-forming cavity in closed position with the core arranged for the injection of the air into the mold cavity.

Figure 1:
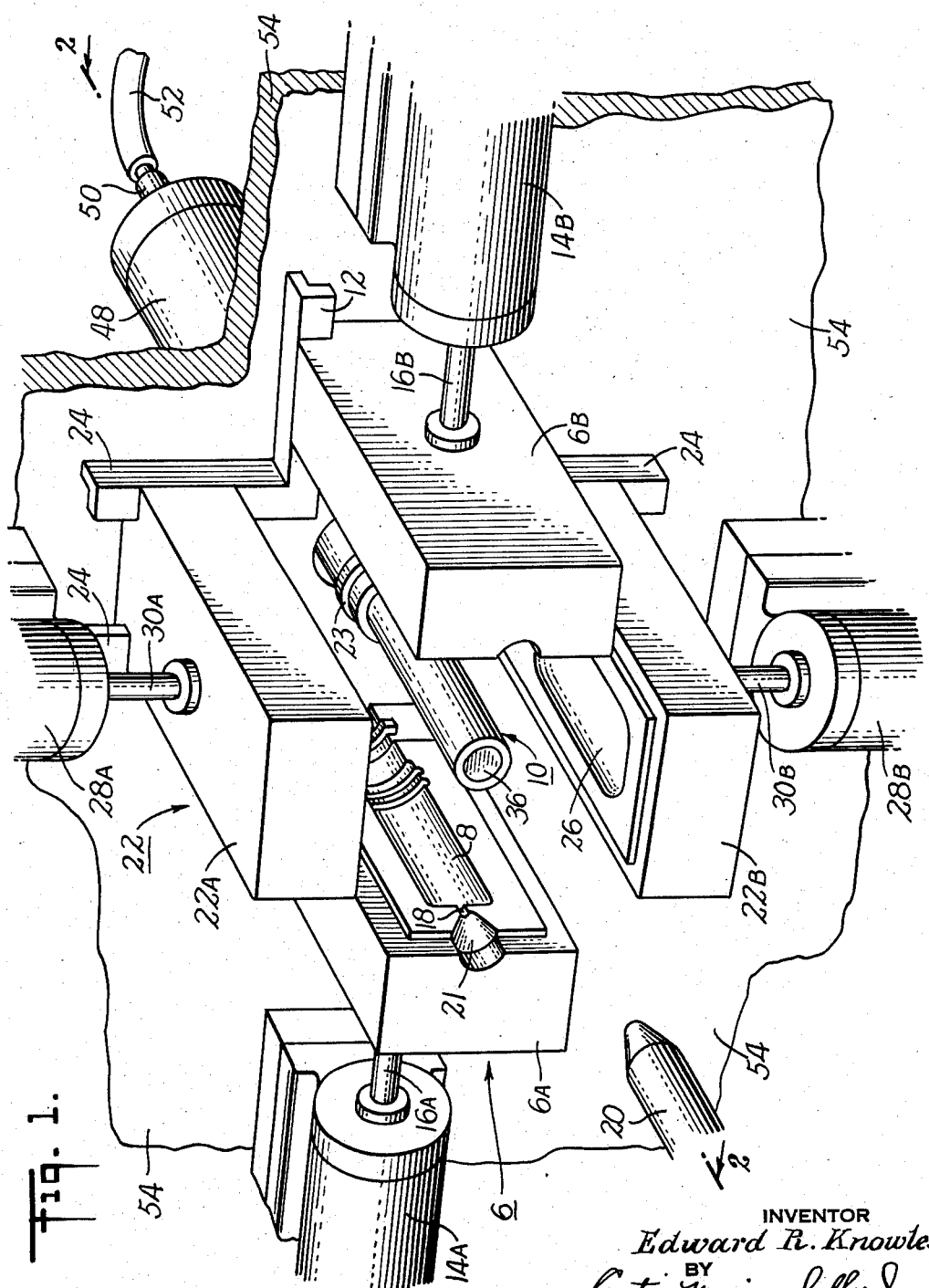
Figure 1 is a partial perspective view showing the arrangement of the parison and article-forming molds.

The apparatus by which the articles are formed will be described in conjunction with a description of the steps in the formation of the plastic articles. A parison 2 (Figure 2) is formed in substantially tubular form with one closed end, as indicated at 4, so that the parison has somewhat the shape of a vial. This parison is formed within a mold 6 which comprises two separable halves 6A and 6B (Figure 1). These mold halves 6A and 6B are arranged to move toward each other into face-to-face relationship (see also Figure 3) and form an internal molding cavity 8 by which the parison 2 is shaped in conjunction with an internal cylindrical core 10 which projects into the mold cavity 8. In order to form the neck-portion of the molded article, the mold cavity 8 extends all the way to one end of the mold, so that at this position the mold halves 6A and 6B fit snugly around the core 10 at one end of the mold.

In order to control the opening and closing of the mold halves 6A and 6B, each of the mold halves is slidably mounted, as on tracks 12, and are opened and closed by means of two hydraulic cylinders 14A and 14B which are connected respectively to the mold halves 6A and 6B. These hydraulic cylinders are constructed in the usual manner and are provided with movable pistons which are connected to shafts 16A and 16B respectively by which the forces are applied to the halves of the mold. Thus in order to close the molds for formation of the parison by injection, the hydraulic cylinders 14A and 14B are actuated to bring the two mold halves 6A and 6B together in face-to-face relationship. A suitable locking device may be provided to hold the molds in closed position or sufficient hydraulic pressure may be maintained on the cylinders 14A and 14B to prevent the molds from opening during the injection process.

In order to form the parison 2 around the core 10, heat-softened plastic material, such as polyethylene, is admitted through a conical orifice 18 into the cavity 8. The apparatus by which the injection of plastic under high pressure, for example 20,000 lbs. per sq. inch, is accomplished, is of conventional design and therefore need not be described in detail here. It is sufficient to point out that an injection nozzle 20 (Figure 2) is arranged to move into engagement with a recess 21 in one end of the parison-forming mold 6 and to inject the heated plastic material through the orifice 18 into the space between the interior of the mold 6 and the central cylindrical core 10. A collar 23 holds the core 10 firmly in position against the pressure exerted by the plastic material on the end of the core 10. As soon as this molding operation is complete, the nozzle 20 is retracted in the usual manner and the mold is opened by means of the cylinders 14A and 14B which are now actuated to retract the mold portions 6A and 6B away from the core 10.

As soon as the parison-forming mold 6 has been separated and the respective parts moved to their retracted positions, and while the parison 2 is still hot, the article-forming mold which comprises two separable sections 22A and 22B positioned on the opposite sides of the core 10 and arranged for sliding movement by means of tracks 24 in directions perpendicular to the movement of the mold portions 6A and 6B, are moved together into face-to-face relationship around the core 10 and the parison 2. The mold portions 22A and 22B are provided with an internal cavity 26 which corresponds to the shape of the article which is to be blown or vacuum-formed. The mold-halves 22A and 22B are closed by means of two hydraulic cylinders 28A and 28B, similar to those previously described, positioned for example respectively above and below the core 10 as best shown in Figure 1, and which are connected respectively to the mold portions 22A and 22B by shafts 30A and 30B. When suitable hydraulic pressure is applied to the cylinders 28A and 28B, two mold-portions 22A and 22B move inwardly and are in face-to-face relationship around the parison 2, the internal cavity of the mold being shaped so as to form a completed neck on the blown plastic article. For example, if a bottle is to be formed, as is indicated by the mold shapes in the drawing, the interior of the neck is provided with the desired shape and finish by the contour of the core 10, and the outer surface of the neck is provided with the desired contour and finish by the shape of the cavity 26.

After the article-forming mold 22 is closed, air is injected under pressure into the interior of the parison 2. This is accomplished by means of a pin 34 (Figure 2) which extends lengthwise within the core 10 and which is provided with a tapered head portion 36 at the end of the core adjacent the closed end of the parison 2, the pin being longitudinally movable within the core 10 against the force of a compression spring 38 which surrounds a portion of the pin 28 and extends between a head 40 on the opposite end of the pin 28 and an internal shoulder 42 on the core 10. Air under pressure is supplied to the interior of the core 10 through a central opening 44 in a core-actuating shaft 46.

Advantageously, a solenoid or other mechanism (not shown) is utilized to move the core pin 34 toward the left slightly so that the head 36 is moved slightly away from the core 10 so as to leave a slight conical space around the head 36. The air passes around the head 40 and then along spaces formed between the pin 34 and the core 10, these spaces being provided by the fluted outer surface of the pin 34 as best shown in Figure 4. The air then passes through the space between the head 36 and the core 10, and is thus applied to the inner surface of the parison 2. The parison 2, which is still in softened condition, is blown outwardly to assume the shape of the cavity of the article-forming mold, for example, as indicated by the broken line 2A in Figure 5.

As soon as the parison has been inflated to conform with the shape of the mold, the pressure is released from within the mold and the mold is opened. The entire core assembly 10, together with the internal pin 34 and associated parts, is then withdrawn from the molded plastic article. The supporting plate 54 serves as a stop to limit the movement of the plastic article as the core is withdrawn. This is accomplished by means of an hydraulic cylinder 48 (Figure 1) which includes a piston that is connected through the shaft 46 to the core 10. The piston is actuated so that the shaft 46 is moved toward the left, as seen in Figure 2, sufficient distance to completely withdrawn the core 10 from the molded article. The molded article then drops into any desired receptacle. The parison-forming mold 6 is then closed and the process repeated to form another molded article.

In order to supply air to the passageway 44 for inflating the article, the opening 44 extends through the piston in the cylinder 48 and connects to a pipe 50, which is connected to the back of this piston and extends out the rear end of the cylinder 48 where it is connected to a flexible tube 52 that leads to a suitable source of compressed air. If desired, the flexible tube 52 can be connected directly to the core 10 so that a solid shaft can be used to move the core 10.

The various mechanisms for the mechanical operation of the system are not described in detail here as such mechanisms are already well-known. The various parts are supported in any desired manner and for example may be mounted on a heavy steel panel 54 as best shown in Figures 1 and 2. In some instance, it is desirable that the article-forming mold 22 and core 10 be heated, for example to a temperature of 180 degrees F., and this is accomplished in the usual manner by the circulation of steam or other media through suitable passageways formed in the mold-halves 22A and 22B. Also in some instances, it may be desirable that the mold-portions 6A and 6B be heated to a similar temperature; this can be accomplished by circulating steam or other media. The amount of heat which is required to be supplied depends to a considerable extent upon the rapidity with which the operation takes place, and the size and shape of the articles being molded. If desired, additional means may be provided for keeping the parison 2 in soft condition while the parison mold 6 is being opened and the article-mold 22 is being closed around the parison. For example, lamps or other heaters may be positioned to provide substantially uniform heating of the parison. Similar radiant heaters can be utilized also to maintain the molds at the desired operating temperature.

From the foregoing, it will be seen that the present invention is well-adapted to carry out the ends and objects hereinbefore set forth and that it can be readily manufactured from conventional materials by fabrication techniques in common use. It will be apparent that the described embodiment of the invention may be modified in various ways to best suit it for each particular application. For example, the hydraulic cylinders can be operated by any desired media, either liquid or gaseous, or they may be replaced entirely by any other mechanical driving system such as a toggle arrangement which has particular utility in the actuation of the parison-forming mold. The shape of the parison can be varied at will and the wall thickness can be so controlled as to produce a wall of uniform thickness in the blown plastic article. These and other modifications all coming within the scope of the present invention will occur to those skilled in this art in the application of this invention to a particular use.

I claim:

1. In injection molding and blowing apparatus for forming from a fusible material a blown hollow article having an open neck portion, the combination which comprises a parison mold formed in two separable parts for molding a parison of said article, means for moving said parison mold parts toward and away from each other from an open position to a closed position, an elongated core extending into said parison mold through one end thereof, means for injecting said thermoplastic material into said parison mold for forming therein said parison of said article, a blowing mold formed of two separable parts, means for moving said blowing mold parts from an open position to a closed position around said core when said parison mold parts are in said open position thereof, the line of movement of said blowing mold parts being in substantially the same transverse plane as the line of movement of said parison mold parts but angularly disposed therefrom and said core being positioned along the axis of the cavities of said blowing mold and said parison mold and axially aligned therewith, and means for injecting air under pressure through said core into said parison for blowing said parison into said article when said blowing mold is in said closed position.

2. Apparatus for forming finished hollow plastic articles having an open neck portion, comprising a parison mold formed in two separable parts, an article mold formed of two separable parts, means for moving said parts of said article mold and said parison mold separately from open positions to closed positions along lines of movement both in the same transverse plane but angularly disposed from each other, an elongated core disposed along the axis of both said parison mold and said article mold and axially aligned therewith to be enclosed within each said parison and said article molds in said closed positions thereof substantially without movement of said core, means for injecting plastic material around said core in said parison mold for molding a parison therein when said parison mold is in said closed position thereof, and means for injecting gas under pressure through said core into said parison for blowing said parison to form said article in said article mold when said article mold is in said closed position thereof around said core.

3. Apparatus for forming finished hollow plastic articles having an open neck, comprising a parison mold formed in two separable parts and including a portion defining the finished outside and inside configurations of said open neck of said article, an article mold formed of two separable parts and including a portion conforming to said outside configuration of said open neck of said article, means for moving said parts of said article mold and said parison mold separately and automatically from open positions to closed positions along lines of movement both in the same transverse plane but angularly disposed from each other and in timed relation to each other, an elongated core disposed along the axis of both said parison mold and said article mold and axially aligned therewith to be enclosed within each said parison and said article molds in said closed positions thereof and with said neck portions of said molds aligned to engage said open neck of said article substantially without movement of said core, automatic means for injecting plastic material around said core in said parison mold for injection molding a parison therein when said parison mold is in said closed position thereof and forming on said parison said finished open neck of said article, and means for injecting gas under pressure through said core into said parison for blowing said parison to form said article in said article mold when said article mold is in said closed position thereof around said core.

4. Apparatus for forming finished hollow plastic articles having a throat portion and an opening therethrough into the interior of the article comprising a parison mold formed in two separable parts and having a vial-shaped internal cavity, a substantially cylindrical central mold core having a longitudinal opening therethrough and positioned within the separable parts of said parison mold, a nozzle receiving passage through one end of said parison mold, a plastic injection nozzle arranged to be inserted in said recess to inject heat-softened plastic into said parison mold to form a parison around said core with substantially no sprue formation, means for moving the parison mold away from the molded parison, an article mold formed of separable parts and having an internal cavity larger than said parison but smaller than said parison mold parts and a throat portion adapted to fit around the open end of the parison, means for closing said article mold about said core and parison while said core remains in fixed position between said separated parts of said parison mold, the line of movement of said parison mold parts being in substantially the same transverse plane as the line of movement of said article mold parts but angularly disposed therefrom and said core being positioned substantially along the axis of said cavities of said parison mold and said article mold, means for forcing air through said core into the interior of said parison, and means for withdrawing said core longitudinally from said article mold.

5. Apparatus for forming finished hollow plastic articles comprising a parison mold formed in two separable parts, means movably supporting said parts of the parison mold opposite one another for movement toward each other into face-to-face engagement, an article mold formed of two separable parts and having an internal cavity larger than that of said parison mold, means movably supporting said parts of the article mold opposite one another for movement together into face-to-face engagement, the line of movement of said parison mold parts being in substantially the same transverse plane as the line of movement of said article mold parts but angularly disposed therefrom and said core being positioned substantially along the axis of said cavities of said parison mold and said article mold, a central mold core positioned centrally with respect to all of said mold parts so as to be enclosed by either mold when the mold is in closed position, plastic injection means arranged to inject softened plastic into said parison mold with substantially no sprue formation to form a parison around said core, means for opening said parison mold and closing said article mold about said core and parison while said core remains in fixed position between said separated parts of said parison mold, means for forcing air into the interior of said parison in timed relation with said opening and closing of said molds, and means for ejecting said article from said core.

6. In injection molding and blowing apparatus for forming from a fusible mass of thermoplastic material a blown hollow article having an open neck portion, the combination which comprises a parison mold formed in two separable parts for the injection molding under substantial pressure of a parison of said article, means for mounting said parts for movement toward and away from each other from a closed position to an open position, means for automatically moving said parison mold parts from said open position to said closed position in timed relation with the operation of said apparatus and including means for positively holding said parts in said closed position against the force of said substantial injection pressure, a nozzle receiving socket in one end of said parison mold, injection means for injecting molten thermoplastic material into said parison mold under substantial pressure and including an injection nozzle configured to fit into said nozzle receiving recess for minimum sprue formation during said injection, means for moving said nozzle axially from an injecting position fitting into said recess to a position spaced from said parison mold, an elongated core extending into said parison mold through said end thereof defining said neck portion of said article, an axial passage through said core, means for delivering air under pressure through said axial passage, a blowing mold formed of two separable parts, a portion of said blowing mold cavity conforming to said neck portion of said article as injection molded in said parison mold, means for mounting said two parts of said blowing mold for movement toward and away from each other from a closed position to an open position wherein said parts are spaced from each other by a distance greater than the width of said parison mold parts, means for moving said blowing mold parts from said open to said closed position automatically in timed relation to the operation of said apparatus, the line of movement of said blowing mold parts being in substantially the same transverse plane as the line of movement of said parison mold parts but angularly disposed therefrom and said core being positioned along the axis of said cavities of said blowing mold and said parison mold and axially aligned with respect to each said mold for fitting engagement of each said mold about said throat portion of said article without movement of said core.

7. In injection molding and blowing apparatus for forming from a fusible mass of thermoplastic material a blown hollow article having an open neck portion, the combination which comprises a parison mold formed in two separable parts for the injection molding under substantial pressure of a parison of said article, means for mounting said parts for movement toward and away from each other from a closed position to an open position, means for positively holding said parts in said closed position against the force of said substantial injection pressure, one end of said parison mold parts conforming to the finished configuration and dimensions of said open neck portion on said article, an injection molding nozzle for injecting molten thermoplastic material into said parison mold under substantial pressure, means for moving said nozzle axially from an injecting position to a position spaced from said parison mold effecting removal of any sprue formed, an elongated core extending into said parison mold through said neck portion end thereof, an axial passage through said core, means for delivering air under pressure through said axial passage, a blowing mold formed of two separable parts and having an internal cavity larger than that of said parison mold but smaller than said parison mold parts, a portion of said blowing mold cavity conforming to said neck portion of said article as injection molded in said parison mold, means for mounting said two parts of said blowing mold for movement toward and away from each other from a closed position to an open position wherein said parts are spaced from each other by a distance greater than the width of said parison mold parts, the line of movement of said blowing mold parts being in substantially the same transverse plane as the line of movement of said parison mold parts but angularly disposed therefrom and said core being positioned along the axis of the cavities of said blowing mold and said parison mold and axially aligned with respect to each said mold for fitting engagement of each said mold about said throat portion of said article without movement of said core.

References Cited in the file of this patent

UNITED STATES PATENTS

| | | |
|---|---|---|
| 523,607 | Vernay | July 24, 1894 |
| 2,290,129 | Moreland et al. | July 14, 1942 |
| 2,298,716 | Moreland et al. | Oct. 13, 1942 |
| 2,353,825 | Hofmann | July 18, 1944 |
| 2,469,130 | Rodman | May 3, 1949 |
| 2,715,751 | Weber | Aug. 23, 1955 |

FOREIGN PATENTS

| | | |
|---|---|---|
| 154,343 | Australia | Nov. 27, 1953 |
| 684,611 | Great Britain | Dec. 24, 1952 |
| 686,291 | Great Britain | Jan. 21, 1953 |
| 502,508 | Belgium | Apr. 30, 1951 |